(12) United States Patent
Soldati et al.

(10) Patent No.: US 10,057,922 B2
(45) Date of Patent: Aug. 21, 2018

(54) METHOD FOR CONTROLLING NETWORK ACCESS POINTS

(71) Applicant: Huawei Technologies Co., Ltd., Shenzhen (CN)

(72) Inventors: Pablo Soldati, Kista (SE); Weijun Sun, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 231 days.

(21) Appl. No.: 14/873,475

(22) Filed: Oct. 2, 2015

(65) Prior Publication Data
US 2016/0029407 A1 Jan. 28, 2016

Related U.S. Application Data (63) Continuation of application No. PCT/EP2013/057200, filed on Apr. 5, 2013.

(51) Int. Cl.
*G01R 31/08* (2006.01)
*H04L 5/14* (2006.01)
(Continued)

(52) U.S. Cl.
CPC ..... *H04W 74/004* (2013.01); *H04W 52/0206* (2013.01); *H04W 74/006* (2013.01);
(Continued)

(58) Field of Classification Search
CPC .... H04W 76/10; H04W 64/003; H04W 76/30
See application file for complete search history.

(56) References Cited

U.S. PATENT DOCUMENTS

| | | | |
|---|---|---|---|
| 2006/0130142 A1* | 6/2006 | Mester | H04L 51/12 726/23 |
| 2008/0281699 A1* | 11/2008 | Whitehead | G06Q 30/02 705/14.41 |

(Continued)

FOREIGN PATENT DOCUMENTS

| | | |
|---|---|---|
| EP | 2360976 A1 | 8/2011 |
| EP | 2387266 A2 | 11/2011 |

(Continued)

OTHER PUBLICATIONS

Ashraf, I. et al., "SLEEP Mode Techniques for Small Cell Deployments," IEEE Communications Magazine, Aug. 2011, 8 pages.

(Continued)

*Primary Examiner* — Brian Roberts
*Assistant Examiner* — Abu-Sayeed Haque
(74) *Attorney, Agent, or Firm* — Slater Matsil, LLP (57) ABSTRACT

The present invention relates to a method and apparatus for controlling network access points in a wireless communicating system, said system comprising: one or more mobile stations, and one or more access points, each access point being arranged for operating in active mode or in inactive mode; said method comprising the steps of: transmitting, by a mobile station, a sensing signal indicating network and/or mobile station specific information associated with at least one mobile station of said system; receiving, by at least one access point or at least one control unit, said sensing signal; and controlling, by said access point or said control unit, transition from active mode to inactive mode, and vice versa, of one or more access points of said system based on said sensing signal.

11 Claims, 7 Drawing Sheets

(a) Sensing control from inactive access point.　　(b) Sensing control from active access point.

(51) Int. Cl.
*H04J 3/00* (2006.01)
*H04W 74/00* (2009.01)
*H04W 52/02* (2009.01)
*H04W 76/28* (2018.01)
*H04W 88/08* (2009.01)

(52) U.S. Cl.
CPC ............ *H04W 76/28* (2018.02); *H04W 88/08* (2013.01); *Y02D 70/00* (2018.01); *Y02D 70/1262* (2018.01); *Y02D 70/142* (2018.01)

(56) References Cited

U.S. PATENT DOCUMENTS

| | | | |
|---|---|---|---|
| 2011/0092234 | A1 | 4/2011 | Kim et al. |
| 2011/0093913 | A1* | 4/2011 | Wohlert ............... H04L 63/101 726/1 |
| 2011/0105116 | A1* | 5/2011 | Kim ..................... H04W 48/14 455/434 |
| 2011/0169612 | A1* | 7/2011 | Alicot ................ G08B 13/2462 340/10.4 |
| 2012/0015657 | A1* | 1/2012 | Comsa ............. H04W 52/0206 455/436 |
| 2013/0301605 | A1* | 11/2013 | Kim .......................... H04L 1/00 370/330 |
| 2014/0241241 | A1* | 8/2014 | Liu ......................... H04W 4/14 370/328 |
| 2014/0274049 | A1* | 9/2014 | Singh ............... H04W 36/0083 455/436 |

FOREIGN PATENT DOCUMENTS

| | | |
|---|---|---|
| KR | 20110041768 A | 4/2011 |
| KR | 101241677 B1 | 3/2013 |
| WO | 2009063417 A1 | 5/2009 |

OTHER PUBLICATIONS

Koudouridis, G.P. et al., "A Centralised Approach to Power On-Off Optimisation for Heterogeneous Networks," Vehicular Technology Conference (VTC Fall), Sep. 3-6, 2012, 5 pages.

"Mechanisms for Efficient Small Cell Operation," 3GPP TSG-RAN WG1 #72, R1-130595, Agenda Item: 7.3.5.3, Qualcomm Incorporated, Document for Discussion and Decision, Jan. 28-Feb. 1, 2013, 3 pages.

"New Study Item Proposal for Small Cell Enhancements for E-UTRA and E-UTRAN—Physical-layer Aspects," 3GPP TSG-RAN Meeting #58, RP-122032, Huawei, HiSilicon, CATR, Document for Information, Agenda Item: 1312, Dec. 4-7, 2012, 10 pages.

"Issues and Enhanced Framework for the Energy Saving Use Case," Nokia Siemens Networks, Nokia, Agenda item: 10.1.1c, 3GPP TSG-RAN WG3 Meeting #60, R3-081281, May 5-9, 2008, 3 pages.

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.4.0, Dec. 2011, 101 pages.

"3rd Generation Partnership Project; Technical Specification Group Radio Access Network; Evolved Universal Terrestrial Radio Access (E-UTRA); Medium Access Control (MAC) protocol Specification (Release 11)," 3GPP TS 36.321 V11.1.0 , Dec. 2012, 57 pages.

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.1.0, Sep. 2012, 325 pages.

"Dynamic Setup of HNBs for Energy Savings and Interference Reduction," Mitsubishi Electric, Agenda Item: 10.1.1c, 3GPP TSG RAN WG3 Meeting #61, R3-081949, Aug. 18-22, 2008, 7 pages.

* cited by examiner

(a) Sensing control from inactive access point.

(b) Sensing control from active access point.

METHOD FOR CONTROLLING NETWORK ACCESS POINTS

This application is a continuation of International Application No. PCT/EP2013/057200, filed on Apr. 5, 2013, which is hereby incorporated by reference in its entirety.

TECHNICAL FIELD

The present invention relates to a method for controlling network access points in a wireless communicating system. Furthermore, the invention also relates to a method in a mobile station, a method in an access point or in a control unit, a mobile station device, an access point device or a control unit, a computer program, and a computer program product thereof.

BACKGROUND

A base station (eNodeB) in a 3GPP Long Term Evolution (LTE) system periodically transmits synchronization signals and relevant system information. A mobile station (user equipment, UE) shall carry out two essential steps to access the network:

A cell search procedure consisting of a series of synchronization steps upon which the UE acquires time and frequency synchronization and other crucial system parameters that are necessary to demodulate the downlink signals and channels; and A random access procedure to declare its presence within the cell, obtain the correct uplink timing synchronization and a unique UE identity (C-RNTI).

The cell-search procedure is used in two cases: for initial synchronization, when a UE detects a cell for the first time and decodes the information needed to register to it; and for identifying new cells, upon a UE registered in the network and searches other cells for handover.

The cell-search procedure exploits two specially designed signals: the primary synchronization signal (PSS) and the secondary synchronization signal (SSS). The particular design of these signals allows a UE to acquire the correct time-frequency synchronization (including subframe boundaries), as well as the physical identity of a cell, the cyclic prefix length, and whether the cell operates in time division duplex (TDD) or frequency division duplex (FDD). With this information, a UE can correctly decode the system information broadcasted by the cell in the physical broadcast channel (PBCH), comprising a set of random-access preamble sequences and the corresponding time-frequency resources, known as the physical random-access channel (PRACH), that can be used to access the network.

Random-access is used in LTE for a number of purposes: for initial access to establish a radio link; to re-establish a radio link after a radio link failure; for handover; and for scheduling request when a dedicated resource has not been granted for scheduling purposes. A common aspect to these purposes is the acquisition of the exact uplink timing and to assign a unique identity, the C-RNTI, to the UE. A UE can perform random-access only on its primary component carrier, in either a contention-based or contention-free manner (the latter only used to re-establish uplink synchronization, handover, and positioning). Contention-based random-access consists of four steps:

Transmission, from the UE to the eNodeB, of a random-access preamble which allows the eNodeB to estimate the uplink timing of the UE.

Transmission, from the eNodeB to the UE, of a timing advance response to adjust the terminal timing estimate obtained at the first step.

Transmission of the UE identity (which depends on whether the UE was already known to the network) using UL-SCH similar to scheduled data.

Transmission of a contention resolution message from the eNodeB to the UE using DL-SCH to resolve any contention due to multiple UEs trying to access the cell using the same random-access procedure.

The contention-free random-access consists only of the first two steps. The first step is the only one requiring physical layer processing. The transmission of a random-access preamble is intended to signal a base station a random-access attempt. A set of 64 preamble sequences are available in each cell divided into two subsets. The sequences forming each subset are signaled to the UE through the PBCH. A UE selects at random a sequence in one subset depending on the amount of data to be transmitted in the third step of the procedure. Therefore, an eNodeB cannot detect a random-access attempt to another eNodeB as it utilizes different time-frequency radio resources and different random-access preamble sequences.

Future generations of radio cellular networks may allow base stations to be switched on/off dynamically in order, for instance, to reduce inter-cell interference and increase spectral efficiency, to adapt to traffic changes, or to save energy. In some cases, a base station could be adapted to transit to an intermediate state, a sleeping/dormant mode, in which only part of its functionalities are switched off or operate in a low-energy mode. For instance, the base station of a cell could overhear the uplink activity in neighboring cells while being inactive in the downlink.

The absence of synchronization signals, broadcast channel and any downlink pilot would render a cell "invisible" to any mobile station within its proximity. Dynamic on/off switching of cells has been proven to be particularly beneficial in terms of both energy and spectral efficiency in heterogeneous cellular networks, i.e., radio cellular networks consisting of macro-cell providing radio coverage to a large area and smaller cells (e.g., pico-cell, femto-cells, etc.) offering radio coverage to a smaller area. This new functionality however requires redesigning several aspects of the traditional radio cellular systems.

In a wireless mobile communication system, where access points can dynamically transit from an active state (wherein all downlink and uplink functionalities are fully operational) to an inactive state (wherein at least some downlink functionalities are fully or partially turned off while the uplink functionalities may or may not be turned on) and vice versa, new methods are needed to enable a mobile station to find an access point to connect to or the access point with the best radio link. Further a dual problem is how a network can control, optimize and adapt the access point configuration and status in response to short-term and/or or long-term changes in the radio environment, traffic statistics, user type of traffic and data rate requirements, user mobility and migration, etc.

Dynamic on/off switching of cells in heterogeneous radio cellular networks has been advocated as a mean to increase energy and spectral efficiency. Standardization bodies, such as the $3^{rd}$ Generation Partnership Project (3GPP), have showed interested in this technology by considering it a potential technique for interference mitigation in deployments of small cells. An enabling technique is the introduction of a new operational state for small cell nodes, a sleep/dormant mode, in which a radio network access node does not transmit any downlink signal (e.g., downlink synchronization signals, broadcast channel, downlink pilots and data) but may still receive uplink signals.

A prior art solution proposes three methods to control the transition of a cell in a radio cellular network from a sleep state to an active state:

Cell self-controlled sleep-mode: assumes the presence of sufficient underlay macro coverage and a low-power sniffer available at the sleeping node. The sleeping node utilizes the power sniffer to detect a rise in the received power when a call is initialized by a UE with a macro-cell. If the received signal strength exceeds a predefined threshold, the UE is deemed close enough to be potentially covered by the sleeping cell and a handover procedure is started.

Core-network controlled sleep-mode: The transition of cell from sleeping to a ready state is controlled by the backhaul using a wake-up message. Also in this case, it is assumed that a UE is initially correctly connected to a macro-cell layer so that the proper core-network element can verify whether there is a sleeping cell, within the macro-cell region, that can serve the UE.

A UE-controlled sleep-mode: places the sleep mode control at the UE side. A UE should broadcasts wake-up signal in order to wake-up sleeping cells within its range. Any time a sleeping cell receives a sensing signal from a UE, the cell would transit to a ready state and serve the UE.

These methods however have practical shortcomings that prevent them to be efficiently utilized in practical radio cellular deployment. For instance, by detecting a raise in received power, a cell cannot distinguish between a surge of inter-cell interference and a nearby mobile station starting a communication with another cell. In addition, a mobile station needs downlink synchronization and other information to decode new downlink pilots from a dormant base station. The overall handover would be long and cumbersome. The core-network controlled sleep-mode, on the other hand, requires the knowledge of the exact geographical location of all small cell nodes and the relative position of mobile stations, which is unrealistic in practical deployments.

An alternative prior art solution proposes to control the activation of dormant cells by reusing the random-access procedure. This procedure however requires that the mobile station has first synchronized to the downlink timing of the cell and received the RACH resources (time-frequency location and preamble sequences set) for the dormant cell. This, however cannot be accomplished when a cell is inactive in downlink. Therefore, new methods and procedures are needed to allow a mobile station to access the network through an inactive cell (dormant or fully switched off) for which no system information is available at the mobile station.

SUMMARY

Generally, an object of the present invention is to provide a solution which mitigates or solves the drawbacks and problems of prior art solutions.

Another first object of the invention is to provide a solution to the problem of enabling mobile stations to find an access point to connect to or the access point with the best radio link in the network, and thereby also a solution to the problem of network access.

Another second object of the invention is to provide a solution to how a network can control, optimize and adapt access point configuration and status in response to short-term and/or or long-term changes in the radio environment, traffic statistics, user type of traffic and data rate requirements, user migration, etc.

According to a first aspect of the invention, the above mentioned objects are achieved by a method for controlling network access points in a wireless communicating system, said system comprising:
one or more mobile stations, and
one or more access points, each access point being arranged for operating in active mode or in inactive mode; said method comprising the steps of:
transmitting, by a mobile station, a sensing signal indicating network and/or mobile station specific information associated with at least one mobile station of said system;
receiving, by at least one access point or at least one control unit, said sensing signal; and
controlling, by said access point or said control unit, transition from active mode to inactive mode, and vice versa, of one or more access points of said system based on said sensing signal.

Preferred embodiments of the invention are defined in the appended dependent claims.

According to a second aspect of the invention, the above mentioned objects are achieved by a method in a mobile station in a wireless communicating system, said system comprising:
one or more mobile stations, and
one or more access points, each access point being arranged for operating in active mode or in inactive mode; said method comprising the step of:
transmitting a sensing signal indicating network and/or mobile station specific information associated with said mobile station.

According to a third aspect of the invention, the above mentioned objects are achieved by a method in an access point or a control unit for controlling network access points in a wireless communicating system, said system comprising:
one or more mobile stations, and
one or more access points, each access point being arranged for operating in active mode or in inactive mode; said method comprising the step of:
controlling transition from active mode to inactive mode, and vice versa, of one or more access points of said system based on a sensing signal indicating network and/or mobile station specific information associated with at least one mobile station of said system.

The methods in the mobile station and access points and/or control units may be modified, mutatis mutandis, according to the different methods in the system. It is further noted that any method according to the invention may be executed by processing means and may be comprised in a computer program product or in a memory unit of a suitable device.

According to a fourth aspect of the invention, the above mentioned objects are achieved with a mobile station device arranged for communication in a wireless communicating system, said system comprising:
one or more mobile stations, and
one or more access points, each access point being arranged for operating in active mode or in inactive mode; said mobile station device comprising:
a transmit unit arranged for transmitting a sensing signal indicating network and/or mobile station specific information associated with said mobile station.

According to a fifth aspect of the invention, the above mentioned objects are achieved with an access point or a control unit arranged for controlling network access points in a wireless communicating system, said method comprising:

one or more mobile stations, and one or more access points, each access point being arranged for operating in active mode or in inactive mode; said access point or control unit comprising:

control means arranged for controlling transition from active mode to inactive mode, and vice versa, of one or more access points of said system based on a sensing signal indicating network and/or mobile station specific information associated with at least one mobile station of said system.

The present invention provides a solution for controlling the transition from an active mode to an inactive mode of access points in a communication system based on network statistics, such as traffic distribution, mobile station distribution, mobility and migration statics, etc.

The present invention further provides a solution to transmit network and mobile station specific information from a mobile station to access points in a communication system representing network statistics used for controlling access points in the system.

Furthermore, the present invention provides a solution for a mobile station to discover an access point to connect to or the access point with the best radio link in a radio communication system where access points may be fully or partially turned off, thereby a also a solution to the problem of accessing the network. The invention further provides a solution to for optimizing and adapting the access point configuration and status in response to short-term and/or or long-term changes in the radio environment, traffic statistics, user type of traffic and data rate requirements, user migration, etc.

Further applications and advantages of the invention will be apparent from the following detailed description

BRIEF DESCRIPTION OF THE DRAWINGS

The appended drawings are intended to clarify and explain different embodiments of the present invention in which.

DETAILED DESCRIPTION OF ILLUSTRATIVE EMBODIMENTS

To achieve the aforementioned and other objects, the present invention relates to a method for controlling network access points in a wireless communication system which comprises of one or more mobile stations, and one or more access points. The access points are arranged for operating in active mode or in inactive mode. The communication system may e.g. be a 3GPP system, such as LTE or LTE-A, but may be any other system with the same general configuration as described in this disclosure.

Furthermore, the term access point broadly denotes any radio access network node, such as a macro base station, a pico base station, a remote radio head, a femto base station, a WiFi access point or new type of nodes with corresponding functions. The terminology of the prior art LTE system is occasionally used, but the skilled reader may interchangeably consider more general notations of channels/signals with same functionalities and properties. The access points can transit from an active state, wherein downlink and uplink functionalities are fully operational, to an inactive state, wherein some or all downlink functionalities are fully or partially turned off, whereas some uplink functionalities may be operative, and vice versa By downlink and uplink functionalities it is intended here the transmission and reception of data channels, control channels, reference signals, as well as other physical layer channels and signals that are necessary for the normal operation of the system.

The present method comprises the steps of transmitting, by a mobile station, a sensing signal indicating network and/or mobile station specific information associated with at least one mobile station; receiving, by at least one access point or at least one control unit, the sensing signal; and controlling, by the access point or the control unit, transition from active mode to inactive mode, and vice versa, of one or more access points based on the sensing signal.

The method at the transmitter side in the mobile station involves transmitting a sensing signal indicating network and/or mobile station specific information associated with the mobile station. The corresponding method at the receiver side in the access point or control unit involves controlling transition from active mode to inactive mode, and vice versa, of one or more access points of the system based on a sensing signal indicating network and/or mobile station specific information associated with at least one mobile station of the system. The sensing signal originates from the mobile station and the transmission/reception aspects of the sensing signal is explained in detail below.

Hence, the invention provides mechanisms for traffic and radio environment sensing at the access points based on network and/or mobile station specific information transmitted by mobile stations, comprising, for instance, a user identity and/or subscriber type, type of traffic and/or service required, channel quality and/or signal strength indicators, etc.

The invention therefore proposes new physical layer signaling mechanisms between mobile stations and access points and/or control units to achieve the first object described above. The information received by an access point can directly be used to transit from a state to another enabling network reconfiguration without the long delay due to higher layer signaling. The inventors recognize, however, that this method implicitly requires inactive access points to have some uplink functionalities operational. This condition can be circumvented by enabling inter-access-point communication and coordination which is described below.

Hence, another object of the invention suggests a method for network control and optimization of on/off activation and resource scheduling of access points based on traffic sensing, so as to dynamically adapt the network operation to short-term and/or long-term changes of the radio environment, user type of traffic and data rate demand, user migration, etc. To achieve this second object, an aspect of the invention is proposing a signaling mechanism for peer coordination among access points, or between access points and a central control unit, i.e., an access point coordinator.

According to an embodiment of the invention a new type of signal, a sensing signal, transmitted by a mobile station and received by at least an access point and/or control unit, which may comprise an indicator for any or a combination all the following information: service type and/or traffic type required by one or more mobile stations; data rate and/or quality of service required by one or more mobile stations; one or more parameters related to uplink or downlink signal strength associated with one or more mobile stations; one or more parameters related to channel quality and/or other signal strength indicators, including reference signal received power (RSRP), received signal strength indicator (RSSI), reference signal received quality (RSRQ), channel quality indicator (CQI), signal-to-noise ratio (SNR), signal-to-interference ratio (SIR), signal-to-noise-plus-interference ratio (SINR), channel state information (CSI), radio propagation environment information; one or more parameters related to measurements of received power and/or energy in certain time-frequency radio resources; transmission power of one or more mobile stations; spatial position and/or mobility and/or migration of one or more mobile stations of the system; identity and/or subscriber type for one or more mobile stations; one or more parameters related to the presence and/or absence of wireless services; one or more parameters related to the presence of other mobile stations and/or other network devices in the system.

The sensing signal can be seen as a probe transmitted by a mobile station to the network. A sensing signal can be transmitted autonomously by a mobile station without coordination or control with the network, for instance, at the activation of a mobile station, but also upon connecting to the network. In another case, a sensing signal transmission is triggered by an access point. Introduction of a sensing signal enables a network to collect relevant network statistics, such as user density and/or migration patterns, type of traffic and/or service required etc. so that to dynamically reconfigure the access point activity to provide better coverage and/or service to the subscribers. The sensing signal can further be used, at an access point, to measure directly the propagation loss, timing advance, or other relevant signal indicators.

Another aspect of the invention enables the transmission of a sensing response signal from an access point to a mobile station, i.e. in the reverse direction compared to the sensing signal.

So, according to another embodiment of the invention an access point and/or control unit transmits a sensing response signal to a mobile station in response to a sensing signal. The access point transmitting the sensing response signal could either be in active mode or inactive mode. In one embodiment, the sensing response signal is the initial stage of the access point activation to enable fast transition from inactive to active state, thereby achieving the first object of the invention. In another embodiment, the sensing response signal comprises a time-advance estimate and/or a user identity and/or other information that can be used to speed up an handover procedure (or contention-free random-access) for a device already connected to the network, or to facilitate the access to the network of a newly discovered device. In another example, a sensing response signal acknowledges a mobile station whether an access point is activating or not, thereby assuring the mobile station either waits for the access point activation or retransmits a sensing signal at a later time.

A further aspect of the invention comprises the transmission of a sensing control signal from an access point/control unit to a mobile station.

Figure 1:
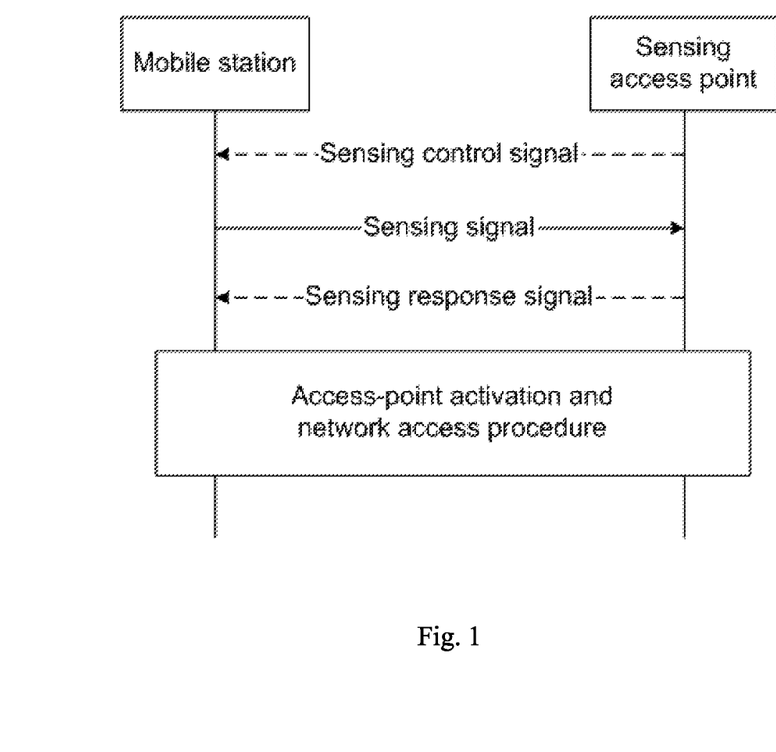
FIG. 1 illustrates access point sensing and activation procedure.

Hence, according to yet another embodiment of the invention, a sensing control signal is transmitted by an access point to trigger the transmission of a sensing signal, thereby enabling the network to sense on demand. The access point transmitting the sensing control signal could either be in active mode or inactive mode. The method is illustrated in FIG. 1, where dashed lines indicate that sensing control and/or sensing response signals may be absent. The final stage is the activation of an access point. In the related art LTE system, this implies transmitting at least downlink synchronization signals (i.e., PSS/SSS), a common reference signal (CRS) port or other downlink reference signals (e.g., DMRS, CSI-RS, etc.), the downlink broadcast channel (i.e., PBCH), a control channel (e.g., PDCCH or EPDCCH) and data channel (e.g. PDSCH).

One aspect of the invention is a signaling mechanism for communication and coordination among peer access points, or between access points and a central control unit, i.e., an access point coordinator. This coordination may comprise any or all the steps of:

Transmitting, from at least an access point, a coordination request message to a central control unit or to a peer access point;

Receiving, at the centralized control unit or at a peer access point, at least one coordination request message from at least one access point;

Transmitting, from the centralized control unit or from a peer access point a coordination control message to at least another access point; and Receiving, by at least one access point, a coordination control message.

Figure 2:
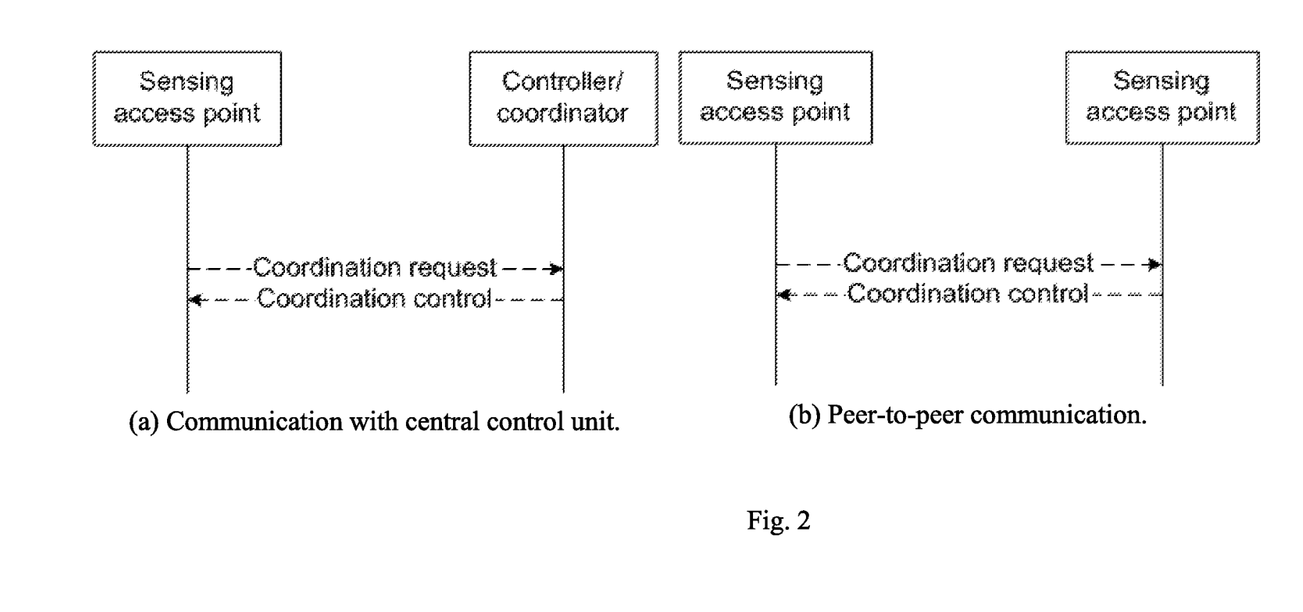
FIG. 2 illustrates signaling method among access points or between access points and a central control unit.

The method is illustrated in FIG. 2, where a dashed line implies an optional signalling. The method achieves the second object: enabling network control and optimization of the on/off activation of access points based on traffic sensing with respect to a suitable performance criterion, e.g. spectral efficiency, latency, energy consumption or a combination thereof. The central control unit can either be a logical entity residing in any radio network access node and/or radio network control node. In one example, a macro-base station (eNodeB) coordinates the on/off scheduling activity of other nodes (e.g., pico-cell, remote radio heads RRH, etc.) deployed within its coverage area. In alternative, any among a number of peer access points (e.g., small cell nodes in the related art LTE system) forming a cluster of coordinated nodes acts as central control unit. The central control unit can also be integrated in a core-network node, e.g., the mobility management entity (MME) of the LTE system.

Figure 3:
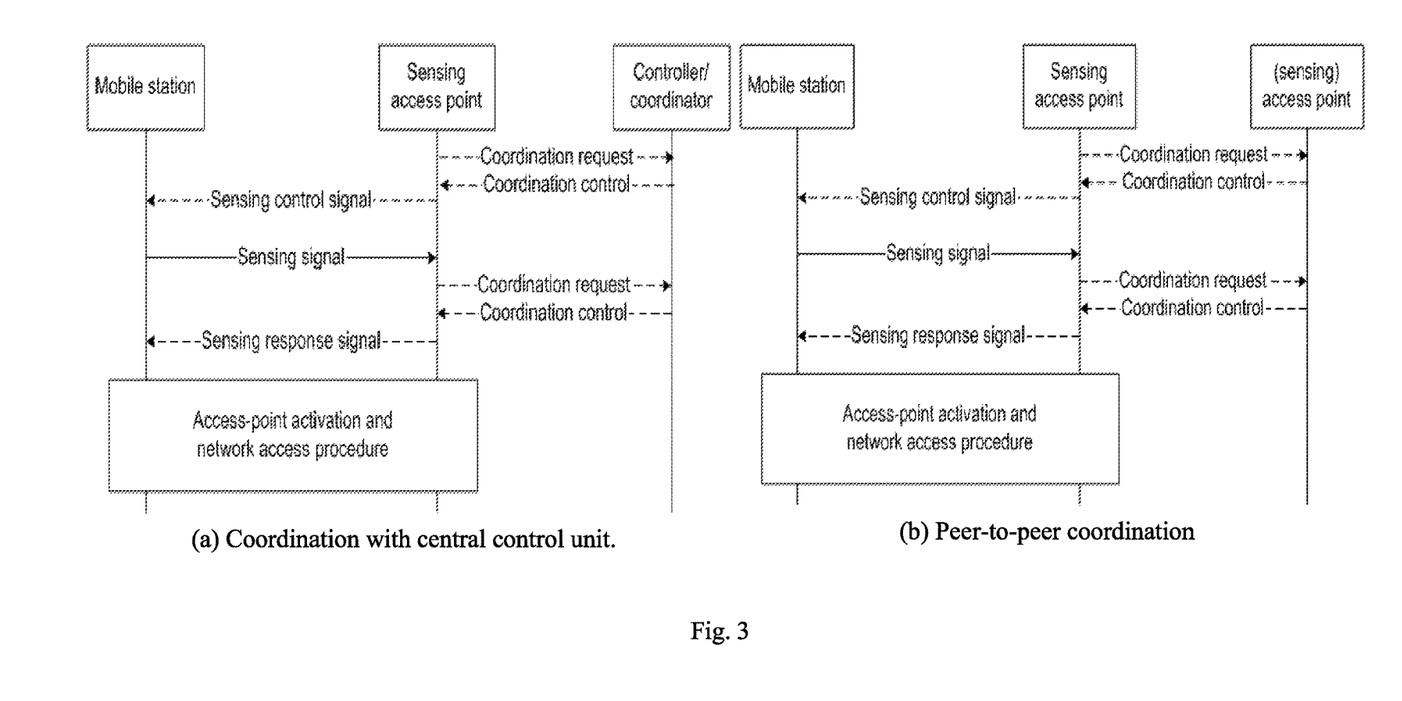
FIG. 3 illustrates access point activation procedure based on uplink sensing signals.

A coordination request message is exchanged from an access point to a central control unit (FIG. 2(a)) or among peer access points (FIG. 2(b)) and may carry any, some, or all the information received and/or inferred by a sensing signal or other uplink signals. In the reverse communication step, the central control unit or a peer access point, respectively, transmit a coordination control message. The recipient of a coordination control message, however, is not necessarily the same access point that transmitted a coordination request message. The coordination control message carries control information and specific tasks for the recipient access point, e.g. at least on/off switching commands, and/or trigger the transmission of a sensing signal from a mobile station in its proximity. FIG. 3 illustrates the combination of various embodiments.

According to another embodiment of the invention, an inactive access point detects and decodes existing uplink signals transmitted in neighbouring cells, such as random-access signals, sounding reference signals, scheduling grant requests, etc. Existing uplink signals represent a valuable source of information that access points can sense (i.e., detect) in a completely transparent manner to a transmitter. The sensed information by an access point may be limited to the presence of a device in its proximity. If the sensed device supports the transmission of sensing signals of new type, a sensing control signal can be used to trigger such transmission from the device. Uplink signals suitable to this scope include, but may not be limited to, access signals (e.g., random-access preamble sequences (RACH) in LTE), uplink reference signals (e.g., sounding signals in LTE), uplink scheduling request signals, etc. The present method enables massive sensing of basic information with existing uplink signals while maintaining backward compatibility to existing wireless communication technologies.

Figure 4:
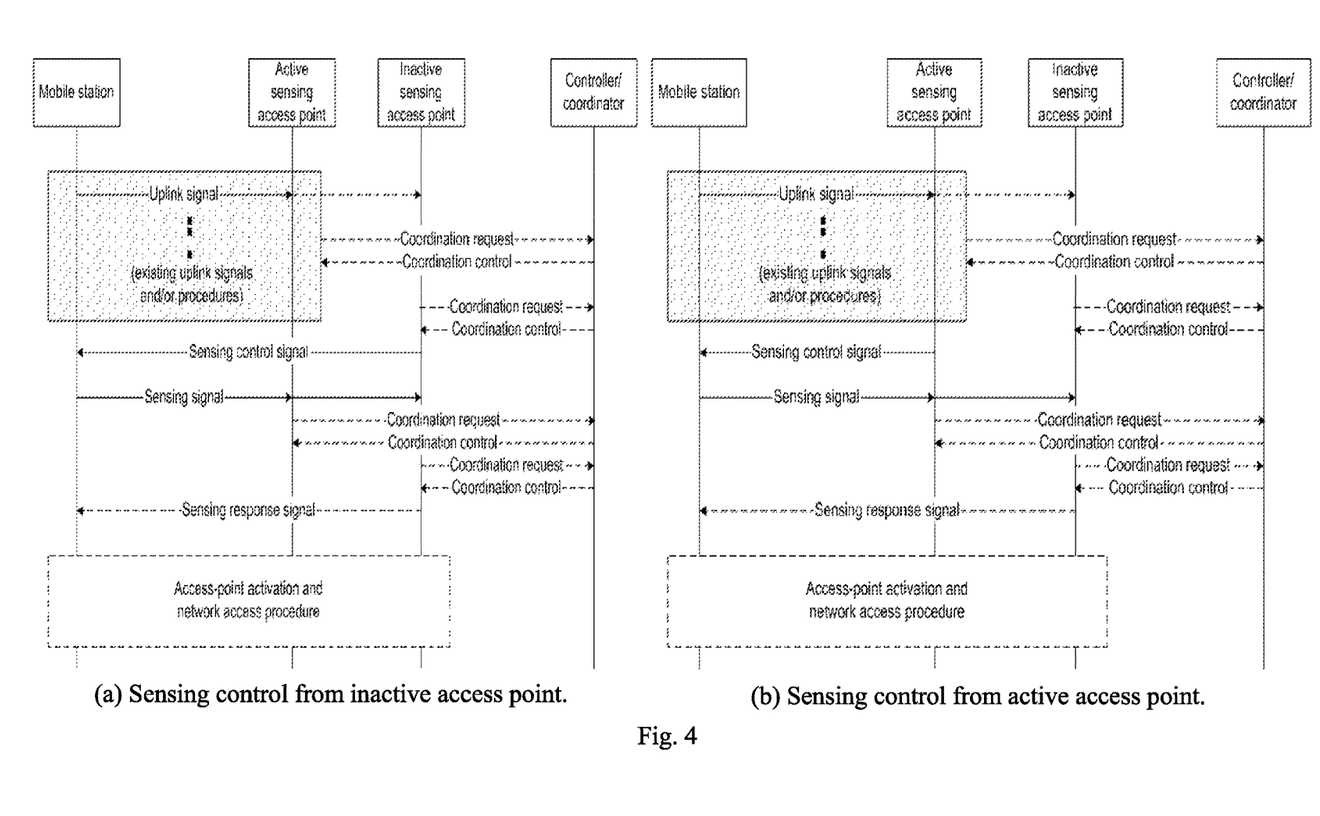
FIG. 4 illustrates sensing of existing uplink signals with central coordination. The sensing signal is triggered by a sensing control signal transmitted by inactive access points (a) or an active access points (b)
Figure 5:
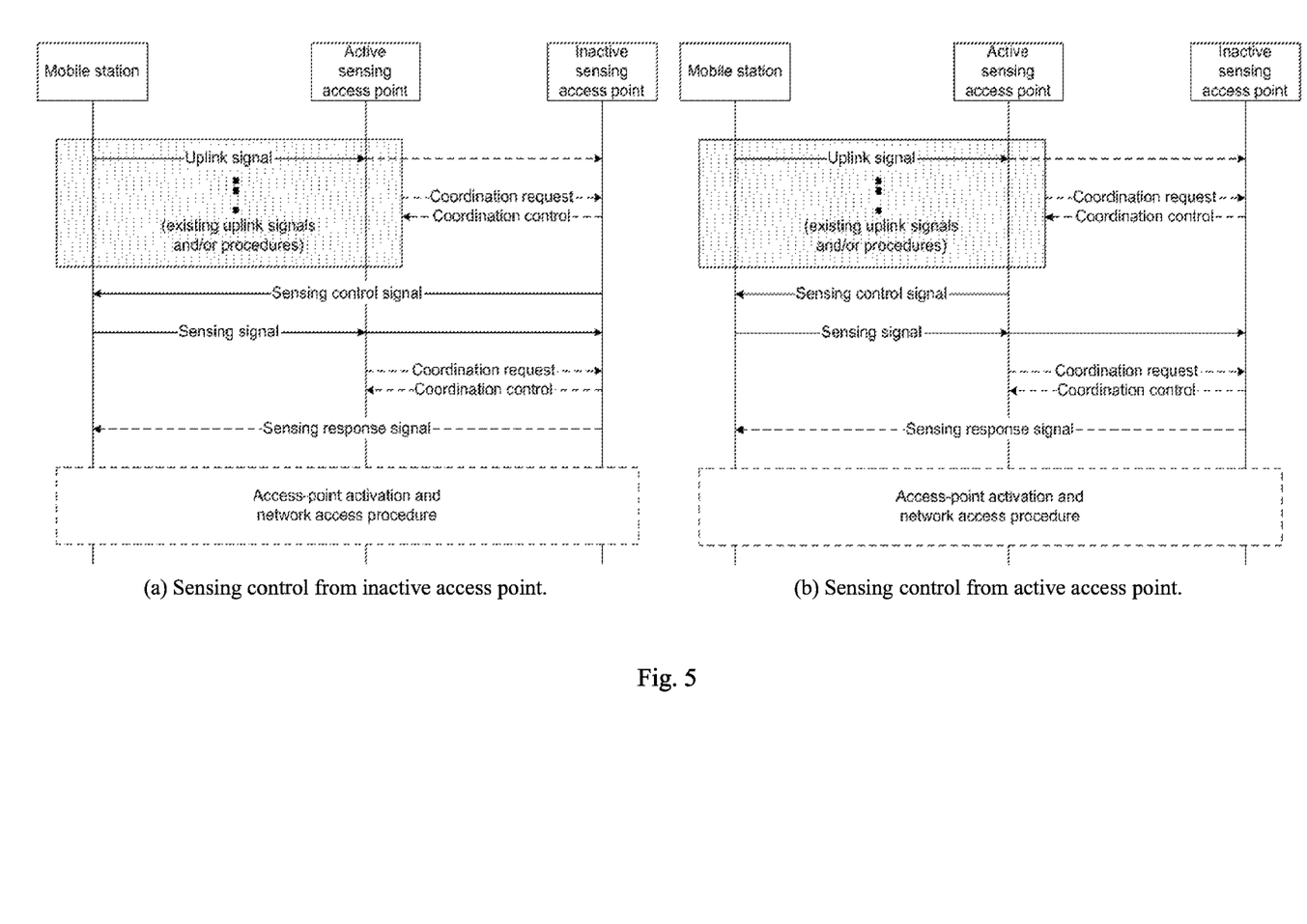
FIG. 5 illustrates sensing of existing uplink signals with peer coordination. The sensing signal is triggered by a sensing control signal transmitted by inactive access points (a) or an active access points (b)
Figure 6:
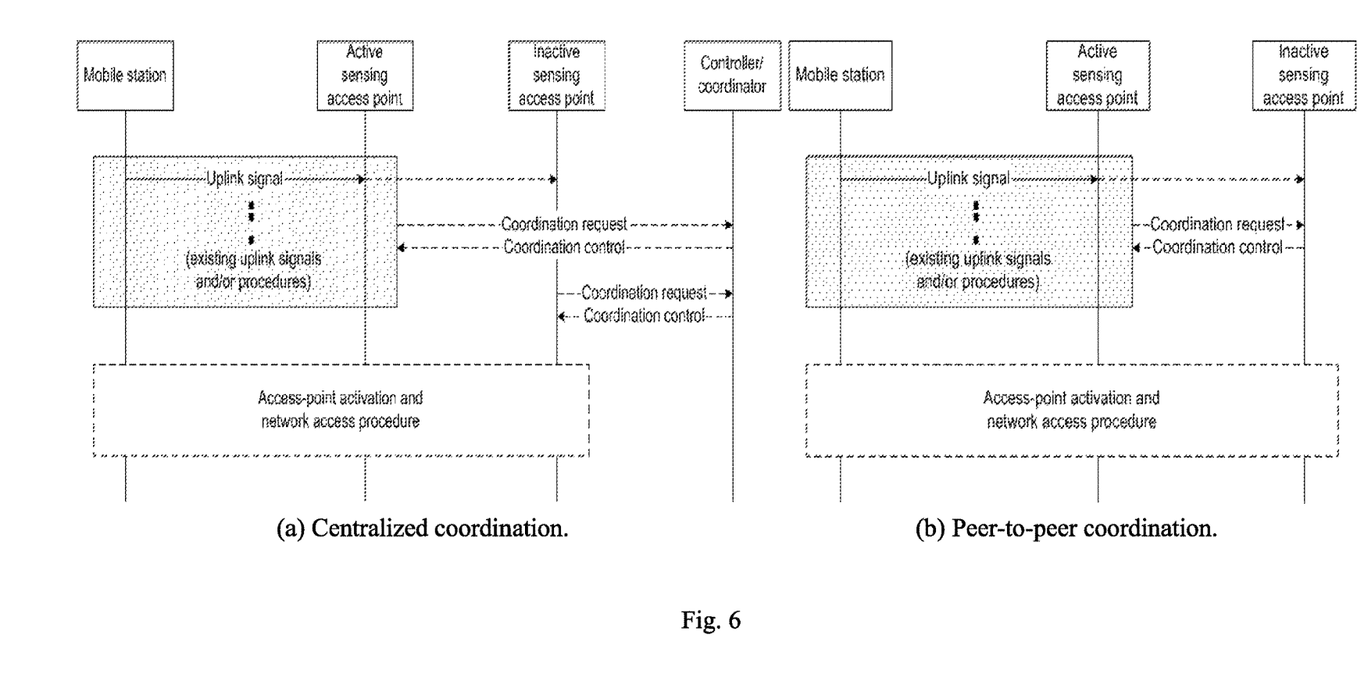
FIG. 6 illustrates sensing of existing uplink signals with centralized coordination (a) and peer coordination (b) with direct access point activation without sensing control signaling.

Combinations of various embodiments are showed FIG. 4 and FIG. 5(a) for centralized coordination, and FIG. 6 and FIG. 5(b) for peer coordination. In FIG. 4 and FIG. 5, a sensing control signal is transmitted a by an already active access point (a) or by an inactive access point (b) to trigger the transmission of a sensing signal. In FIG. 6 the decision of activating an access point is based only on existing uplink signals. The skilled reader may find that other combinations of previous embodiment are possible.

According to an embodiment, an active access point covering a large area (e.g., a macro eNodeB in the related art LTE system) and experiencing high traffic load transmits a sensing control signal to instruct any, some or all mobile stations in its coverage area to transmit a sensing signal. The sensing signals received by inactive access points are used to decide which access point to activate for offloading the active access point with high traffic.

The following embodiments relate to the design of the individual signals of the present invention, namely: the sensing signal; the sensing response signal; the sensing control signal; the coordination request message; and the coordination control message.

A sensing signal, a sensing response signal, and a sensing control signal, may be transmitted using each a set of predefined radio resources known at both the transmitter and the receiver, the sets of resources comprising at least a set of signal sequences and a set of time-frequency radio resources.

The sensing operation may imply that a mobile station is not yet discovered by the radio access network, and vice versa, i.e., the mobile station is not aware of the type of network (e.g., TDD, FDD), the time-frequency alignment, or the downlink/uplink frequency bandwidth. It is therefore beneficial to use a set of predefined radio resources for the transmission/reception of each of the signals involved in the sensing procedure, so that the transmitter can transmit a signal without prior coordination or knowledge of the receiver and vice versa, i.e., the receiver can correctly detect and decode a signal without prior knowledge of signalling exchange with the transmitter. The signal sequences may comprise any random sequence, Zadoff-Chu sequence, Walsh sequences, or other sequences depending on specific requirement, such as cross-correlation (or other) properties.

According to an embodiment at least some of the predefined radio resources used for each of a sensing signal, a sensing control signal, a sensing response signal are common for said sensing signal, said sensing response signal and said sensing control signal. A benefit of this method is to infer, at a received of a sensing signal or sensing control signal, information related to the transmitter, which can be applied to tailor a signal transmitted in the opposite direction to be correctly decoded by the intended receiver.

According to another embodiment, the set of predefined radio resources that can be used for the transmission of any of sensing signal and a sensing control signal, and a sensing response signal is in at least one TDD and/or one FDD carrier. As an inactive access point does not transmit any system information in its downlink carrier, a mobile station cannot know a priori whether a potential inactive access point is configured for TDD or FDD operation, in which carrier, and the corresponding bandwidth configuration. This embodiment resolves this issue.

In one embodiment, the set of predefined radio resources used for transmitting any of a sensing signal, a sensing response signal, and a sensing control signal is in the middle of a TDD and/or a FDD carrier bandwidth and corresponds either to the smallest frequency bandwidth configurable in the system or to at least one resource block within the smallest frequency bandwidth configurable in the system. A benefit of this method is to assure the signalling design to be bandwidth agnostic, and the configuration to be known at both transmitter and receiver. For the related art LTE system, this corresponds to a set of time-frequency radio resources comprising the six central physical resource blocks of an uplink and/or downlink frequency carrier.

In one embodiment, a transmitter selects at least a signal sequence among a set of predefined signal sequences and at least a set of radio resources among a predefined set of radio resources for the transmission of any of sensing signal, or a sensing control signal, or a sensing response signal. Any of the physical layer signals involved in the traffic sensing procedure shall at least a signal sequence transmitted over a set of time-frequency radio resources characterizing the information transmitted and the signal itself.

In the following disclosure signal design is considered.

Sensing Signal Design

Figure 7:
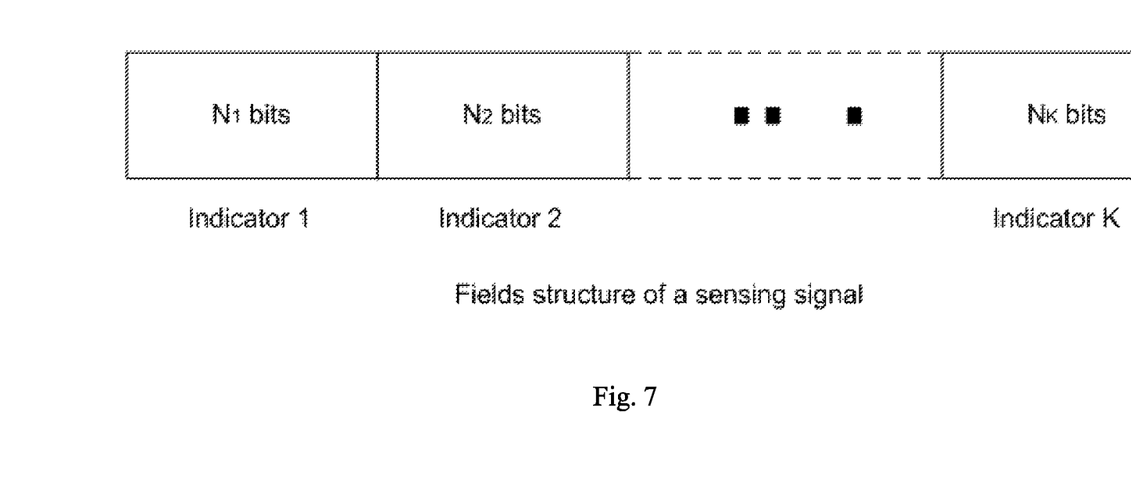
FIG. 7 shows representation of the field structure of a sensing signal.

A sensing signal may comprises at least a number $K \geq 1$ of information fields, labelled by an integer index $k=0, \ldots, K-1$, each comprising a number $N_k$ of information bits encoding a specific information. FIG. 7 illustrates the field structure of a sensing signal. Each field of a sensing signal is associated with an information type such as, but not be limited to: service type and/or traffic type required by one or more mobile stations; data rate and/or quality of service required by one or more mobile stations; one or more parameters related to uplink or downlink signal strength associated with one or more mobile stations; one or more parameters related to channel quality and/or other signal strength indicators, including reference signal received power (RSRP), received signal strength indicator (RSSI), reference signal received quality (RSRQ), channel quality indicator (CQI), signal-to-noise ratio (SNR), signal-to-interference ratio (SIR), signal-to-noise-plus-interference ratio (SINR), channel state information (CSI), radio propagation environment information; one or more parameters related to measurements of received power and/or energy in certain time-frequency radio resources; transmission power of one or more mobile stations; spatial position and/or mobility and/or migration of one or more mobile stations of the system; identity and/or subscriber type for one or more mobile stations; one or more parameters related to the presence and/or absence of wireless services; one or more parameters related to the presence of other mobile stations and/or other network devices in the system. The information carried in the k-th field is represented by one out of the $2^{N_k}$ possible combinations of the $N_k$ bits forming the field.

The presence of an indicator of the used transmission power enables the receiver access point to estimate the propagation loss from the transmitter. The benefit of transmitting a user identity is to associate the received signal and information therein to a specific user. The identity could be: temporary or permanent, valid for the whole network or a group of access points, assigned by the network or available to the user prior accessing to the network.

According to one embodiment, each sequence within the set of predefined signal sequences associated to a sensing signal is mapped to one combination of the information bits forming the signal data fields. With a sensing signal comprising $$N = \sum_{k=0}^{K-1} N_k$$

bits, there are $2^N$ possible combinations of the N information bits $\{b_n\}_{n=0}^{N-1}$ with $b_n \in \{0,1\}$. According to this method, the set of sequences utilized for the transmission of a sensing signal shall comprise at least $2^N$ sequences, each associated to one combination of the N bits $\{b_n\}_{n=0}^{N-1}$.

According to an embodiment, a field of the sensing signal encodes the sensing signal format. A sensing signal format can be indicated to the receiver by a marker encoded, for instance, in the first field thus enabling up to $2^{N_1}$ signals formats. Different formats enable to carry different information fields, thereby reducing the number N of bits, hence the number of predefined sequences and the receiver complexity.

According to another embodiment, a sensing signal comprises a sequence out of a set of predefined sequences modulated with a transmitter-specific sequence. A transmitter-specific sequence can be generated based on a physical identity of the transmitter (e.g., mobile station). The modulation consists of a symbol-by-symbol operation as one of addition, subtraction, multiplication division or others. The transmitter identity is either assigned by the network in a way described in a related embodiment or belongs to a set of identities as part of the predefined set of resources. This method has the benefit of associating the information in a sensing signal to a transmitter, thereby enabling the network to distinguish and correlate sensing signals received at different the access points.

According to an embodiment, the set of predefined resources used for the transmission of sensing signals comprises a set of random-access preamble sequences, and the corresponding radio resources, of the related art LTE system. In one example, a set of $2^N$ random-access preamble sequences, common to all or a group of access points, is used for sensing signals. In one example, N=6 information bits are transmitted with 64 random-access preamble sequences of the related art LTE system. In another example, access points are either equipped to exchange the respective random-access resource configuration (i.e., random-access preamble sequences and radio resources), or receive this information by decoding the broadcast channel of neighbouring cells without any coordination. This enables an inactive access point to detect a mobile station in its proximity keeping backward compatibility to earlier releases of LTE.

According to another embodiment, the set of predefined resources used for the transmission of a sensing signal comprises at least a set of sequences and the corresponding radio resource configuration used for sounding reference signals in the related art LTE system. This method enables an inactive access point to detect the transmission of existing uplink reference signals in neighbouring cells. In one example, active access points of the related art LTE system signal the configuration of sounding reference signals for mobile stations within their coverage area to neighbouring inactive access points.

According to another embodiment, the set of predefined radio resources used for the transmission of a sensing signal comprises at least one OFDM symbol in time-domain and at least a set of sub-carriers in the frequency domain. One method to transmit a sensing signal in communication system based on Orthogonal Frequency Division Multiplex (OFDM) transmission is to use a single ODFM symbol in time domain and a set of sub-carriers in the frequency domain. This has the benefit of confining the interference produced to other transmissions. Another method is to transmit a sensing signal over multiple OFDM symbols in time domain and over a set of subcarriers in frequency domain. In the related art LTE system, this is done by using one or more physical resource blocks (PRB) in time and/or frequency, each consisting of twelve subcarriers in frequency domain (i.e., 180 kHz) and a 0.5 ms slot in time domain, i.e. 6 or 7 OFDM symbols depending on the cyclic prefix. Using two consecutive PRB in time domain, a sensing signal occupies a 1 ms subframe.

According to one embodiment, the sensing signal is transmitted periodically over time according to either a fixed or adaptive duty cycling period. It is beneficial for a mobile station, when decides to transmits a sensing signal autonomously, to adapt the time interval between one sensing signal transmission and the next one based on its data traffic, QoS requirement, type of traffic etc.

Sensing Response and Sensing Control Signals Design

According to an embodiment, at least two predefined sequences are used for transmitting and receiving a sensing response signal and/or a sensing control signal. The sensing response signal and the sensing control signal may comprise a single information bit $b=\{0,1\}$. For example a sensing response signal, b=1 denotes the activation of an access point, b=0 a denied activation, or vice versa. For a sensing control signal, one value of the information bit may trigger the transmission of a sensing signal from a mobile station. Each value of the bit is associated with one out of two predefined sequences. A receiver decodes the information by detecting the transmitted sequence.

According to one embodiment, a sensing response signal and/or sensing control signal comprises a number $M \geq 1$ of information fields, labelled by an integer index m=0, . . . , M−1, each comprising a number $N_m$ of information bits encoding a specific information. In some cases, it is beneficial to transmit additional information from an access point and/or control unit to a mobile station with a sensing control signal. An indicator of the transmit power of the access point helps the mobile station estimate the propagation loss from the access point. The access point identity helps the mobile station decode downlink reference signals. An identity to be used by the mobile terminal and/or a timing advance estimate can also be signalled within a sensing response signal to facilitate the mobile station access the network through the access point. It is clear to the skilled reader, that the design of sensing response and sensing control signals with multiple information fields may follow the same embodiments and design of the sensing signal described above.

According to one embodiment, the information bits of a sensing response are modulated by a receiver-specific sequence. An access point transmits a sensing response signal upon receiving a sensing signal. The transmitted sensing response signal comprises a sequence obtained by modulating one sequence out of the set of predefined sequences representing the information bits with a receiver-specific sequence. The benefit is to enable only the mobile station that transmitted a sensing signal to correctly detect and decode the sensing response.

According to another embodiment, the information bits of a sensing response and/or a sensing control signal are modulated by a transmitter-specific sequence. The benefit of this method is to allow the receiver (e.g., a mobile station) associate the received signal and information therein to a particular transmitter (e.g., an access point). The transmitted sensing response and/or sensing control signal comprises a sequence obtained by modulating one sequence out of the set of predefined sequences representing the information bits with a transmitter-specific sequence based on the transmitter identity. In one exemplifying embodiment for the related art LTE system, the receiver-specific sequence used to modulation operation is at least one of the PSS/SSS sequences of the LTE synchronization channel.

According to an embodiment, the time-frequency radio resources used for sensing response and sensing control signals correspond to a synchronization channel of the system. Combined with a previous embodiment, this has the benefit of reusing available resources and using a sensing response as a first step of the access point activation.

According to an embodiment, the transmission of sensing response and/or sensing control signals further comprises transmitting at least a downlink reference signal. This has the benefit to enable the receiver to measure the signal strength of the sensing control signal, e.g. RSRP in a LTE system, or other channel quality indicators. In the related art LTE system, one method is to transmit at least a downlink common reference signal (CRS) port in at last the PRB pairs occupied by a sensing response signal or a sensing control signal. Another method is to transmit at least a demodulation reference signal (DM-RS) port or a channel-state information reference signal (CSI-RS) port in the PRB pairs occupied by sensing response or sensing control signals. In this case, it is beneficial if the reference signal sequence is transmitter-specific. When the six central physical resource blocks (PRB) of the downlink frequency bandwidth are used for transmitting sensing response and/or sensing control signals, the method is compatible with the design of new carrier types (NCT) the LTE system by using reduced CRS signals or new DMRS patterns.

Coordination Request and Coordination Control Messages

According to one embodiment, the coordination request and the coordination control messages are transmitted over an inter-access point interface. The communication between access points and between an access point and a central control unit occurs through a dedicated interface. In the related art LTE system, such interface is referred as to the X2 interface. Another method is to exchange coordination request and the coordination control messages over a dedicated control channel over the air interface.

Furthermore, as understood by the person skilled in the art, any method according to the present invention may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, the invention also relates to suitable devices, in this case a mobile station device and an access point device/control unit. Mentioned devices are configured and comprise suitable capabilities/means for performing any method according to the present invention. They may also be modified, mutatis mutandis, according to the different embodiments of the present method. Suitable capabilities/means may e.g. be: memory, input and output elements, processing unit, control means, transmit and receive units, etc. which should be fully understood by the skilled person.

The mobile station device is arranged for communication in a wireless communicating system and comprises a transmit unit arranged for transmitting a sensing signal indicating network and/or mobile station specific information associated with the mobile station.

Correspondingly, the access point or control unit comprises control means arranged for controlling transition from active mode to inactive mode, and vice versa, of one or more access points of a wireless communication system based on a sensing signal indicating network and/or mobile station specific information associated with at least one mobile station of the system.

Finally, it should be understood that the present invention is not limited to the embodiments described above, but also relates to and incorporates all embodiments within the scope of the appended independent claims.

What is claimed is:

1. A method of operating a mobile station in a wireless communication system including the mobile station, at least one other mobile station and one or more network access points, each of the one or more network access points being arranged for operating in an active mode or in an inactive mode, the method comprising:
   transmitting, by the mobile station, a sensing signal to one of the one or more network access points, wherein the transmitted sensing signal indicates mobile station specific information associated with the mobile station and further mobile station specific information associated with the at least one other mobile station;
   wherein each mobile station specific information comprises at least one of a service type required by the associated mobile station, a spatial position and a mobility of the associated mobile station.

2. The method according to claim 1, further comprising receiving a sensing response signal sent in response to a transition, by a network access point of the one or more network access points, between the active mode and the inactive mode.

3. A non-transitory computer readable medium having stored thereon a computer program instructions, which when executed by a processor, causes the processor to causes said processing the method according to claim 1.

4. The non-transitory computer readable medium according to claim a, wherein the non-transitory computer readable medium comprises one or more of ROM (Read-Only Memory), PROM (Programmable ROM), EPROM (Erasable PROM), Flash memory, EEPROM (Electrically EPROM) and hard disk drive.

5. A method for controlling a network access point in a wireless communication system including a mobile station and at least one other mobile station and one or more network access points, each network access point being arranged for operating in an active mode or in an inactive mode, the method comprising:

receiving, by a network access point of the one or more network access points, from the mobile station, a sensing signal, wherein the received sensing signal indicates mobile station specific information associated with the mobile station and further mobile station specific information associated with the at least one other mobile station, wherein each mobile station specific information comprises at least one of a service type required by the associated mobile station, a spatial position and a mobility of the associated mobile station; and controlling, by the one network access point, a transition from an inactive mode to an active mode of the network access point of the communication system based on the sensing signal.

6. The method according to claim 5, further comprising:
transmitting, in response to said sensing signal, a sensing response signal which enables the transition.

7. The method according to claim 6, wherein the sensing response signal indicates at least one of an activation acknowledgement of a network access point, a timing advance estimate, a mobile station identity, a synchronization signal, a downlink reference signal, control information and network access information.

8. The method according to claim 6, wherein the sensing response signal is sent in response to receiving a sensing control signal.

9. A mobile station device arranged for communication in a wireless communication system comprising the mobile station device, at least one other mobile station device, and one or more network access points, each of the one or more network access point being arranged for operating in an active mode or in an inactive mode, the mobile station device comprising:

a transmitter configured to transmit a sensing signal to one of the one or more network access points, wherein the transmitted sensing signal indicates mobile station specific information associated with the mobile station device and further mobile station specific information associated with the at least one other mobile station device;

wherein each mobile station specific information comprises at least one of a service type required by the associated mobile station device, a spatial position and a mobility of the associated mobile station.

10. An apparatus arranged for controlling a network access point in a wireless communication system comprising a mobile station and at least one other mobile station and one or more network access points, each of the one or more network access points being arranged for operating in an active mode or in an inactive mode, the apparatus comprising a processor configured to:

receive, from the mobile station, a sensing signal, wherein the received sensing signal-indicates mobile station specific information associated with the mobile station and further mobile station specific information associated with the at least one other mobile station, and control a transition from an inactive mode to an active mode of the network access points of the communication system based on the sensing signal;

wherein each mobile station specific information comprises at least one of a service type required by the associated mobile station, a spatial position and a mobility of the associated mobile station.

11. A method for controlling a network access point in a wireless communication system comprising a mobile station and at least one other mobile station and one or more network access points, each of the one or more network access point being arranged for operating in an active mode or in an inactive mode, the method comprising:

transmitting, by the mobile station, a sensing signal, wherein the received sensing signal-indicates mobile station specific information associated with the mobile station and further mobile station specific information associated with the at least one other mobile station;

receiving, by at least one of the one or more network access points, said sensing signal; and controlling, by said at least one network access point, a transition from an inactive mode to an active mode of the network access point based on said sensing signal;

wherein each mobile station specific information comprises at least one of a service type required by the associated mobile station, a spatial position and a mobility of the associated mobile station.

* * * * *

UNITED STATES PATENT AND TRADEMARK OFFICE
CERTIFICATE OF CORRECTION

PATENT NO. : 10,057,922 B2
APPLICATION NO. : 14/873475
DATED : August 21, 2018
INVENTOR(S) : Pablo Soldati et al.

Page 1 of 1

It is certified that error appears in the above-identified patent and that said Letters Patent is hereby corrected as shown below:

In the Claims

In Column 14, Line 63, Claim 4, delete "claim a" and insert --claim 3--.

Signed and Sealed this
Twenty-third Day of October, 2018

Andrei Iancu
*Director of the United States Patent and Trademark Office*